UNITED STATES PATENT OFFICE.

ROZEL M. CURTISS, OF UNION, ILLINOIS.

COMPOSITION FOR DESTROYING CANADA THISTLES.

SPECIFICATION forming part of Letters Patent No. 548,966, dated October 29, 1895.

Application filed August 11, 1894. Serial No. 520,004. (No specimens.)

*To all whom it may concern:*

Be it known that I, ROZEL M. CURTISS, a citizen of the United States, residing at Union, in the county of McHenry and State of Illinois, have invented a new and useful Composition for Destroying Canada Thistles, &c., of which the following is a specification.

The object of this invention is to destroy Canada thistles and other weeds by the employment of a composition of matter consisting of arsenious acid, bichloride of mercury, and cyanide of potash. These ingredients are united in the proportion of eighteen parts of arsenious acid, one part bichloride of mercury, and one part cyanide of potash.

In use an opening is made in the ground at the root of the thistle or weed to be killed and a quantity of the compound deposited in the opening, after which it is closed. The cyanide of potash, in addition to its destroying qualities, will absorb moisture, which will assist the other ingredients to dissolve, to be absorbed by the plant, and the action of the compound is much more rapid than if the ingredients were used separately.

I claim as my invention—

The composition of matter consisting of arsenious acid, bichloride of mercury and cyanide of potash in the proportions and combined in the manner described.

ROZEL M. CURTISS.

Witnesses:
   A. S. NORTON,
   W. H. CURTISS.